CHARLES J. KOESTER
HAROLD OSTERBERG

*INVENTORS.*

BY

BLAIR, SPENCER & BUCKLES.
ATTORNEYS.

Aug. 25, 1964   C. J. KOESTER ETAL   3,146,294
INTERFERENCE MICROSCOPE OPTICAL SYSTEMS
Filed Feb. 13, 1959   3 Sheets-Sheet 2

CHARLES J. KOESTER
HAROLD OSTERBERG
INVENTORS.

BY

BLAIR, SPENCER & BUCKLES,
ATTORNEYS.

United States Patent Office 3,146,294
Patented Aug. 25, 1964

3,146,294
INTERFERENCE MICROSCOPE OPTICAL SYSTEMS
Charles J. Koester, Bethesda, Md., and Harold Osterberg, Sturbridge, Mass., assignors to American Optical Company, Southbridge, Mass., a voluntary association of Massachusetts
Filed Feb. 13, 1959, Ser. No. 793,108
13 Claims. (Cl. 88—39)

This invention relates to improved optical systems for photometric measurements to determine the transmittance or absorption of a microscopic specimen, and more particularly to optical systems adapted to perform the optical path length measurements possible with interference microscopes and also adapted to measure the light transmittance or absorption characteristics of microscopic specimens.

Microphotometry and microspectrophotometry—the measurement of the optical transmittance of a microscopic specimen and of its transmittance for various wavelengths of the spectrum—have heretofore generally employed single-beam apparatus because of the difficulty and expense of providing two suitable beams. A two-beam system has been suggested by Pollister and Ornstein, Analytical Cytology (McGraw-Hill, New York, 1955), Chapter 1, but this system requires two separate optical systems which are necessarily identical. Such a duplicate arangement is cumbersome, and the need for identical optical elements makes such systems prohibitively expensive.

Interference microscopes, particularly those of the AO-Baker type, employ a single beam of light which is split into two separate coherent beams, one passing through the specimen particle, and one through its surround. The relative transmittance of a microscopic specimen and its surround can be determined in such microscopes if the intensities of the two beams can be measured or matched by suitable apparatus.

Accordingly, a principal object of the invention is to provide improved optical systems capable of measuring the transmittance of a specimen object relative to the transmittance of its surround. Another object of the invention is to provide systems of the above character capable of measuring the optical path length of such a specimen object relative to its surround. A further object of the invention is to provide optical systems of the above character providing calibrated means for matching the intensities of a specimen beam and a reference beam of light. Still another object of the invention is to provide systems of the above character incorporating comparison means for determining with precision when the intensities of the two beams are matched. A further object of the invention is to provide optical systems of the above character adapted for use either by visual observation or by photo-electric observation associated with visual display or recording devices. Another object of the invention is to provide systems of the above character suitable for measuring the transmittance of microscopic specimens for a plurality of light wavelengths. A further object of the invention is to provide systems of the above character which are economical to manufacture and convenient to operate. Still another object of the invention is to provide optical systems of the above character which are adapted for incorporation in interference microscopes. Other objects of the invention will in part be obvious and will in part appear hereinafter.

The invention accordingly comprises the features of construction, combinations of elements and arrangements of parts which will be exemplified in the constructions hereinafter set forth, and the scope of the invention will be indicated in the claims.

For a fuller understanding of the nature and objects of the invention, reference should be had to the following detailed description taken in connection with the accompanying drawings, in which.

Similar reference characters refer to similar parts throughout the several views of the drawings.

Interference microscopy has proved useful for the detection and measurement of optical path differences between a specimen particle and its surround. For a specimen particle having different absorption characteristics from its surround, an additional valuable measurement is the "transmittance" of the particle for different wavelengths of light. Microphotometers and microspectrophotometers used for making such transmittance measurements have heretofore been limited generally to single beam designs, as mentioned above, primarily because of the difficulty and expense of providing a suitable second beam in an integrated optical system.

The present invention employs the two beams formed in interference microscopes of the shearing type to determine transmittance of the specimen relative to the transmittance of its surround. The transmittance may be determined by measuring the luminous intensity of the light transmitted by the specimen, or the radiant energy or "luminous flux" transmitted thereby. While direct measurements can be taken of the intensity in candlepower or the luminous flux in lumens of each beam, extremely precise transmittance determinations can be made by varying the relative incident intensities of the two beams by calibrated adjustments, and employing comparison means to determine when the transmitted intensities are equal.

A beam of unpolarized light may be regarded as a mixture of many sine-wave vibrations oriented in many directions, each of which is perpendicular to the direction of propagation of the beam. A beam of polarized light may be regarded as one such vibration oriented in one such direction, which together with the axis of propagation, defines the "polarization plane." Unpolarized light directed through a "polarizer" or "analyzer" emerges as plane polarized light vibrating only in planes parallel to the "polarization plane" of the polarizer or analyzer.

Figure 1:
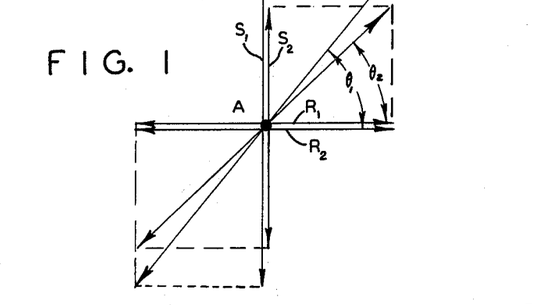
FIGURE 1 is a vector diagram illustrating the optical principles underlying the present invention.

In FIGURE 1, the two vectors $S_1$ and $R_1$ may be taken to represent end views of two sine-wave vibrations proceeding along the axis A of the light beam path, but vibrating respectively in perpendicular planes containing this axis. The light observed at a point on the axis A will be the resultant of these two vibrations, and if the two sine-waves are in phase, this resultant will lie in a resultant polarization plane oriented at an angle of inclination $\theta_1$ from the component plane, the angle $\theta_1$ being governed by the amplitude of the two component beams.

Figure 2:
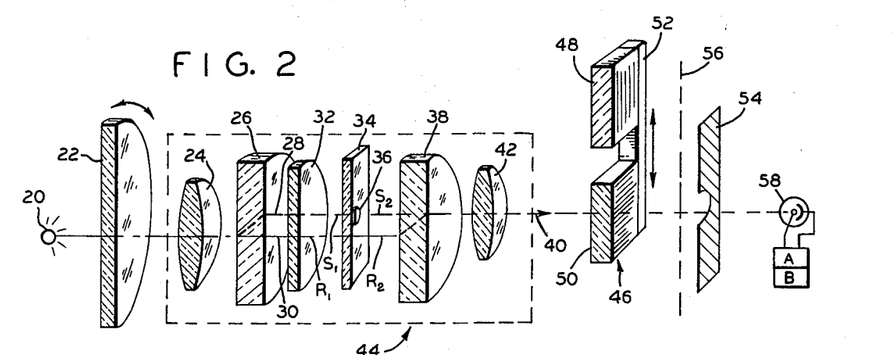
FIGURE 2 is a schematic diagram of an optical system incorporating one embodiment of the present invention.

Conversely, if plane polarized light is directed at the beam dividing element of an interference microscope, such as the birefringent plate 26 shown in FIGURE 2, it will be divided into two normally plane polarized components. If the optical paths of these component beams are otherwise of equal length, a specimen interposed in one beam will introduce a phase difference between the beams which will be governed by the thickness and refractive index of the specimen. By measuring this phase difference, the observer may determine the optical thickness or refractive index of the specimen. The measurement of such phase differences is accomplished by techniques well known in the science of interferometry.

A phase difference between two normally plane polarized component beams makes the resultant vector revolve about the axis, and the length of the resultant vector generally changes during such revolution. The tip of this vector generally traces an elliptical path, and the resultant beam is therefore termed "elliptically polarized." If the components are of equal amplitude and the phase difference is 90°, the ellipse becomes a circle and the resultant beam is called "circularly polarized."

When the incident light is divided into two beams plane polarized in mutually perpendicular planes, as in the shearing type of interference microscope, the relative intensities of these two beams may conveniently be varied by means of a rotatably adjustable polarizer, such as a Nicol prism or the sheet of substantially transparent polarizing material 22 shown in FIGURES 2 through 7, preferably interposed between the source of illumination and the beam-dividing elements. Such an adjustable polarizer has the effect of changing the angle of inclination $\theta_1$ of the polarization plane of the polarized light incident on the shearing elements of the system. These elements in turn resolve this light into two mutually perpendicular plane-polarized components indicated by $S_1$ and $R_1$ in FIGURE 1. The length of the vectors $S_1$ and $R_1$ corresponds to the "amplitude" of the light vibrations making up each beam, and when the angle $\theta_1$ is changed, the resulting changes in the amplitudes of the components $S_1$ and $R_1$ produce corresponding changes in the intensities of the two beams.

If beam $S_1$ is directed through a light absorbing specimen particle while beam $R_1$ is directed through a nonabsorbing "surround" or reference area, the absorbing specimen will reduce the amplitude of incident beam $S_1$ to a value such as $S_2$, as shown in FIGURE 1, while the emergent amplitude $R_2$ of the reference beam will be the same as its incident amplitude $R_1$.

In the various embodiments of the present invention, the angle of inclination $\theta_1$ of the incident beam's plane of polarization is varied, as by adjusting the calibrated rotatable polarizer 22 (shown in FIGURES 2 through 7), until the partially-absorbed emergent specimen beam has an amplitude $S_2$ equal to that of the emergent reference beam $R_2$. Comparison means of various kinds are employed to determine when $S_2$ and $R_2$ have been matched, and the transmittance of the specimen particle can then be determined from the amount of such polarizer adjustment required.

The phase difference between the two emergent beams $S_2$ and $R_2$ introduced by the specimen may also be determined with the systems of the present invention. For this purpose there is provided a calibrated phase-adjusting device, which cancels this phase difference to bring the two beams back into phase. Alternatively, the phase-adjusting device may be set to introduce an additional phase difference sufficient to bring the two beams 90° out of phase. Various analyzers and other elements are employed to identify the desired in-phase, or 90° phase difference, condition. Each analyzer employed in the present invention, like the polarizer, may be any suitable polarizing device, such as a Nicol prism. The polarizer and analyzer are preferably sheets or plates of substantially transparent polarizing material interposed in the light beam to be "polarized" or "analyzed."

Figure 4:
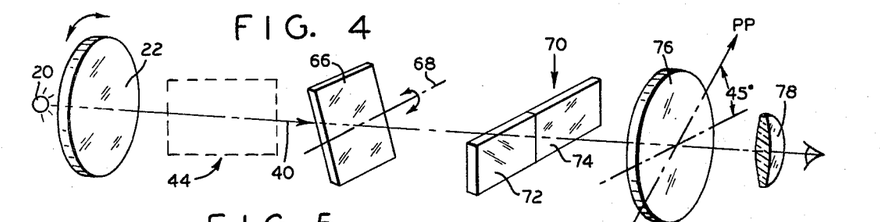
FIGURE 4 is a schematic diagram of an optical system incorporating a third embodiment of the invention including a tiltable birefringent compensator plate and a quartz biplate.
Figure 5:
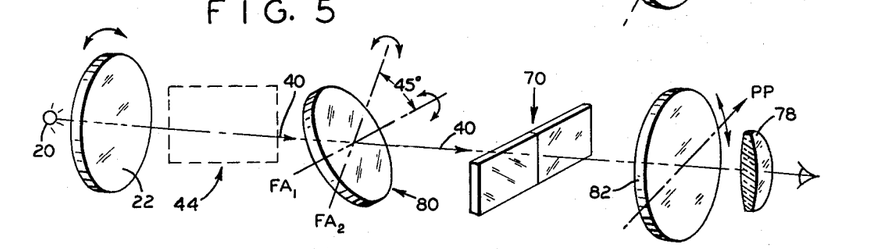
FIGURE 5 is a schematic diagram of an optical system incorporating a modification of the embodiment shown in FIGURE 4.
Figure 7:
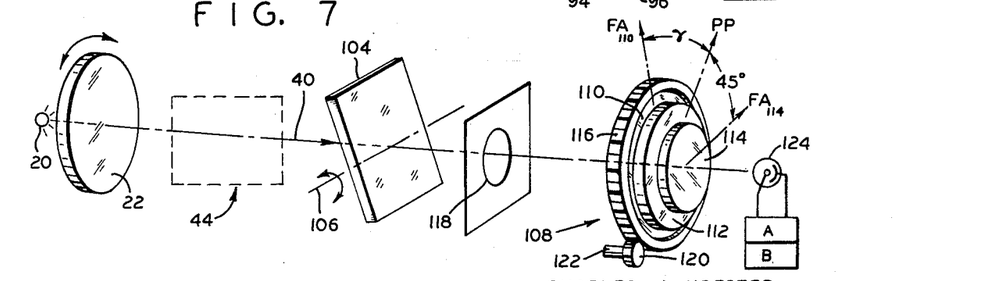
FIGURE 7 is a schematic diagram of an optical system incorporating still another embodiment of the invention.

The phase-adjusting means may be a tilting "birefringent" compensator plate, as shown in FIGURES 4, 5, and 7, or any other suitable device for selectively changing the relative phase of two adjacent or overlapping beams which are perpendicularly plane polarized.

"Birefringent" materials are so named because they are "anisotropic," i.e., their optical properties depend on the angular direction at which the light travels through the crystal. In general, light of a given polarization travels through the crystal at a different velocity than light polarized perpendicularly thereto. In a uniaxial crystal there is one direction along which light of all polarizations travels with the same velocity. This direction is called the optic axis. In biaxial crystals such as mica there are two such directions, and therefore two optic axes.

When a plane parallel plate is cut from uniaxial material, for light incident normally on the plate there is always one vibration direction which is perpendicular to the optic axis. This direction is then known as the "fast" axis if the crystal has positive birefringence. Perpendicular to this direction is the "slow" axis of the plate. If the crystal has negative birefringence, these axes are reversed. Similarly a plate cut from a biaxial crystal will have a fast and a slow axis. With such plane parallel plates it is convenient to speak merely of the fast and slow axes, or the "principal axes," thus avoiding the use of the terms uniaxial, biaxial, positive birefringence and negative birefringence.

Furthermore, if the optic axis of a uniaxial crystal is not parallel or perpendicular to the direction of light through the crystal, then light travelling through the crystal is separated into two beams—the ordinary and the extraordinary beams—which vibrate in directions perpendicular to each other, and which not only travel at different velocities through the crystal, but also follow different paths. For a discussion of these phenomena, see Frocht, "Photoelasticity" (Wiley, 1941), vol. 1, pp. 103–116.

If a ray of plane polarized light is directed into such birefringent material with its incident plane of polarization oriented at an angle of about 45° to the two normal principal axes, the beam may be regarded as divided into two components, each being polarized in a plane parallel to one of the principal axes, and one component will pass through the material more slowly than the other. When the material is a "half-wave" plate, i.e., a plate having a chosen thickness such that the relative retardation of this slower component is equal to one-half of the wavelength of the light, this has the effect of changing or "rotating" the plane of polarization of the emerging light by 90° with respect to the incident plane of polarization.

Similarly, a "quarter-wave plate," with its principal axis oriented at 45° to the plane of polarization of incident plane polarized light, introduces a one-quarter wavelength or 90° phase difference between the two components, thus converting plane polarized light into circularly polarized light.

Figure 3:
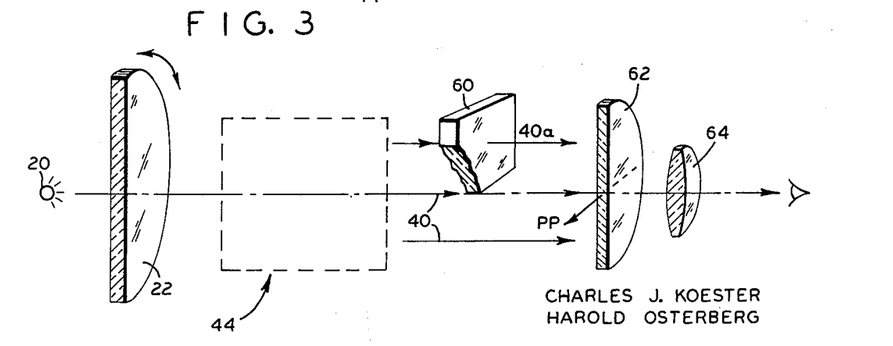
FIGURE 3 is a schematic diagram of an optical system incorporating another embodiment of the invention.

In some of the embodiments of the present invention, it is possible to make simultaneous readings of transmittance and optical path difference. Both visual and photoelectric detection are possible, and in most of the systems light of a finite range of wavelengths may be used. When the two beams are normally plane polarized, as they are in shearing-type interference microscopes, the required matching of amplitudes may be performed by using interchangeable analyzers, as shown in FIGURE 2, or by using a half-shaped device giving a divided field for visual observation, as shown in FIGURE 3. A rotatably adjustable analyzer may be used to sample beam amplitudes at successive azimuths, creating fluctuations in the visible light transmitted or the signal from a photocell.

Figure 6:
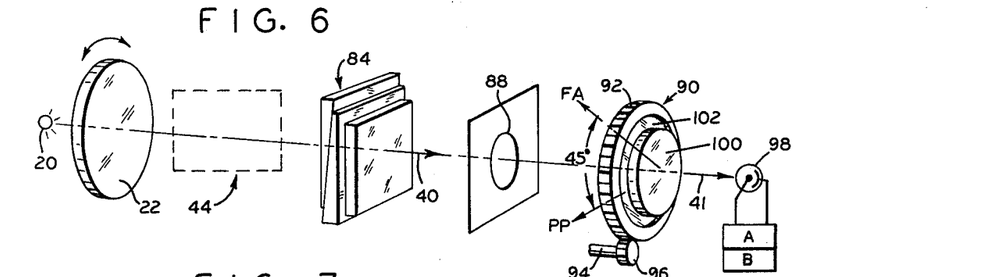
FIGURE 6 is a schematic diagram of an optical system incorporating another embodiment of the invention including a rotating analyzer.

The relative amplitudes of the beams may be changed with the adjustable polarizer, and the condition of equal amplitudes of the two beams may be identified by visual or photocell comparison of the beams in the systems of FIGURES 2 and 3, or by employing visual half-shade techniques and bringing the two beams into phase when the analyzer's plane of polarization is set at 45° to the beams' planes of polarization, as in FIGURE 4. When a 90° phase difference between the two beams is created, a rotating analyzer may be used as hereinafter described to determine which initial polarizer setting reduces the resulting elliptically polarized light to circularly polarized light (FIGURES 5, 6 and 7).

The effect of matching of the amplitudes of the specimen and reference beams is illustrated by the vector diagram of FIGURE 1, and may be understood by reference to the optical system shown in the schematic diagram of FIGURE 2.

Referring first to FIGURE 1, the incident amplitudes of the specimen beam and the reference beam are represented by the vectors $S_1$ and $R_1$, respectively. The transmitted amplitudes of the specimen and reference beams are represented by the vectors $S_2$ and $R_2$, respectively. The intensity transmittances of the specimen object ($T_o$) and surround or reference ($T_r$) are:

$$T_o = \frac{S_2^2}{S_1^2} \text{ and } T_r = \frac{R_2^2}{R_1^2}$$

In most cases the transmittance of the surround will be unity, making $R_2 = R_1$. From FIGURE 1 it will be seen that $$\frac{S_2}{R_2} = \tan \theta_2 = 1$$

$$\frac{S_1}{R_1} = \tan \theta_1$$

Therefore the ratio of intensity transmittances is:

$$\frac{T_o}{T_r} = \frac{S_2^2}{S_1^2} \cdot \frac{R_1^2}{R_2^2} = \frac{\tan^2 \theta_2}{\tan^2 \theta_1} = \frac{1}{\tan^2 \theta_1}$$

The angle $\theta_1$ can be measured physically if it corresponds to the inclination azimuth of a plane polarized beam which is divided, as by a birefringent element, into two normally plane polarized component beams corresponding to $S_1$ and $R_1$. The angle $\theta_1$ may be carefully selected and adjusted to make the absorption of the specimen reduce the incident amplitude $S_1$ to the desired transmitted amplitude $S_2 = R_2$, as described above and shown in FIGURE 1.

Shearing types of interference microscopes, such as the AO-Baker interference microscope, generally divide a single beam of illumination into separate beams 28 and 30 in the manner shown in FIGURE 2. Thus, the illumination from a source 20 is plane polarized at an azimuth $\theta_1$ by a rotatably adjustable polarizer 22, shown as a sheet of transparent polarizing material in FIGURES 2 through 7. This illumination passes through a condenser lens system, shown schematically as a single lens 24 in FIGURE 2, to a first birefringent element 26, which may be a properly oriented calcite plate, and which divides the light into two beams 28 and 30. Both beams pass through a 90° rotator 32, such as a half-wave plate, which reverses the respective polarization planes of the two incident beams, now labelled $S_1$ and $R_1$, permitting a second birefringent element 38 to recombine the two beams to form a superimposed compound beam 40 after incident beam $S_1$ has passed through specimen 36 to become transmitted beam $S_2$ while beam $R_1$ has passed through the "surround" outside specimen 36 to become transmitted beam $R_2$. Compound beam 40 passes through an objective lens system, shown schematically as a single lens 42 in FIGURE 2, and is directed toward the other elements hereinafter described in detail. Beam-dividing and re-combining elements 26 and 38 are generally made substantially identical, so that the only difference in the optical path lengths of the two beams is that introduced by the passage of beam 28 through specimen 36. This path difference is measured to determine the thickness or optical characteristics of the specimen 36.

Since all of the embodiments of the present invention herein described include a beam-dividing and reuniting system such as that shown in FIGURE 2, this system is generally indicated at 44 in FIGURES 2 through 7.

The normal plane polarization of the two beams $S_2$ and $R_2$ produced by the beam-dividing birefringent element 26 permits the relative intensities of the two beams to be varied by changing the azimuth of inclination $\theta_1$ of the rotatably adjustable polarizer 22. The determination of the polarizer azimuth for which the amplitudes of the two beams are most precisely matched can be achieved by the use of various comparison devices employed in the different embodiments of the present invention.

In the embodiment shown in FIGURE 2, the amplitudes of the two superimposed, normally-polarized beams are compared by using a two position analyzer generally indicated at 46, which may take the form of two separate analyzers 48 and 50 preferably made of transparent polarizing material and mounted on a slidable frame member 52 adapted to move one or the other of the analyzers 48 or 50 into a position intercepting the beams. Analyzer 48, for example, may have its polarization plane parallel to the plane of polarization of the specimen beam $S_2$, while analyzer 50 has its polarization plane parallel to the plane of polarization of the reference beam $R_2$.

An iris diaphragm 54 is located near image plane 56, and a light-sensitive device 58, such as a photocell or a photomultiplier tube, is positioned to receive light passing through the aperture of diaphragm 54, and connected to suitable amplifying circuits and display devices generally indicated by blocks "A" and "B" in FIGURE 2. When analyzer 48 is in position, photocell 58 will produce a signal proportional to the intensity of beam $S_2$, since perpendicular beam $R_2$ will be blocked by analyzer 48. When analyzer 50 is in position, the photocell signal will be proportional to the intensity of beam $R_2$. Adjustable polarizer 22 may be varied until the two photocell signals are equal, identifying the polarizer azimuth corresponding to $\theta_1$ in FIGURE 1.

Any errors introduced by polarization sensitivity of the photomultiplier 58 can be minimized by the use of a depolarizer such as wax paper, or a quarter-wave plate with its axis oriented at 45° to the transmission direction of each analyzer, located between the analyzer and the photomultiplier, such as element 100 in FIGURE 6, described below. The effect of such a 45° quarter-wave plate is to convert each plane polarized beam into two equal components one-quarter wavelength or 90° out of phase, producing a circularly polarized beam as explained above.

It will be evident that the adjustable polarizer may be calibrated so that $\theta_1$ may be measured from the polarization plane of the reference beam, as shown in FIGURE 1, or the polarizer may be calibrated so that the transmittance ratio, $$\frac{T_o}{T_r} = \frac{1}{\tan^2 \theta_1}$$

is directly indicated on a suitable scale.

Another form of two-position analyzer (not shown), which may be used in this embodiment of the invention, is a rotatably adjustable single analyzer which may be switched through 90° from one desired polarization plane to the other to perform the functions of the separate polarizers 48 and 50 of FIGURE 2.

A different embodiment of the invention adapted for visual observation and matching of the two beams $S_2$ and $R_2$ is shown in FIGURE 3. Here, the rotatably adjustable polarizer 22 and the system 44 produce the two transmitted beams $S_2$ and $R_2$, as described above. A polarization rotator 60 providing approximately 90° rotation of the plane of polarization, such as a half-wave plate of birefringent material, is positioned to cover a part of the field, with a principal axis oriented at 45° to each of the perpendicular polarization planes of the beams $S_2$ and $R_2$. A fixed analyzer 62 is oriented with its polarization plane PP parallel to the polarization plane of one of the normally polarized beams $S_2$ and $R_2$. If analyzer 62 is oriented to pass only the reference component beam $R_2$, the 90° rotator will in effect reverse the polarization planes of components $S_2$ and $R_2$ in the rotated portion of the field 40a, and only the rotated specimen component beam $S_2$ will be passed by the analyzer over the rotated part of the field.

Thus the intensities of the two beams may be visually compared directly through eyepiece 64, since one part of the field (40a) will be illuminated only by beam $S_2$, and the other part (40) will be illuminated only by beam $R_2$. Thus, the polarizer 22 may be adjusted until the two parts of the field display equal intensity, indicating the desired value of $\theta_1$ required to match the intensities of the two component beams, as shown in FIGURE 1.

The 90° rotator may be a plate of rotatory material such as quartz, or a half-wave birefringent plate selected for any particular desired wavelength of monochromatic light. If the rotators 32 and 60 are both achromatic rotators, as described in Charles J. Koester's copending application, Serial No. 752,479, issued October 30, 1962, as U.S. Patent No. 3,060,808, the sytem will be capable of handling light of a range of wavelengths, and microspectrophotometry measurements can thus be made conveniently.

The embodiments shown in FIGURES 2 and 3 and described above are useful in cases where it may not be convenient to obtain the conditions required for interference microscopy. For example, the object may have a large optical path relative to the surround and it may not be possible to immerse the sample in a liquid of nearly the same refractive index.

With specimens suitable for interferometry measurements, on the other hand, the embodiments of the invention shown in FIGURES 4, 5, 6, 7 may all be used to determine both transmittance and optical path difference, thus providing a single instrument suitable for both interferometry and microphotometry.

These embodiments all include a phase adjusting device or compensator, which can be any one of several types. A Soleil compensator, such as element 84 in FIGURE 6, has been used successfully. Also a tilting wave-plate of mica, such as the elements 66, 80 or 104 shown in FIGURES 4, 5 and 7, has been found to be very effective. A Berek compensator can also be used, but difficulties have been encountered in practice due to slight misalignments of the optic axis of the calcite relative to the axis of rotation. Any other compensator which introduces a variable phase difference between the object and reference beams and provides a uniform field may be used.

A Soleil compensator of the usual design, which is capable of several wavelengths of retardation, will not provide a uniform retardation over the whole field due to the change in angle of incidence with field position. This disadvantage can be overcome by the use of very thin quartz plates and wedges in the compensator, and the Soleil compensator 84 in FIGURE 6 is shown with the thickness of its elements exaggerated for clarity of illustration.

The tilting half- or full-wave plate 66 shown in FIGURE 4 provides a fairly uniform field. The axis of tilt 68 of the plate, which is also one of its principal axes, is aligned parallel to the plane of polarization of the object (or reference) beam. Therefore, tilting the plate changes the retardation of one beam relative to the other.

The embodiment shown in FIGURE 4 employs the rotatably adjustable polarizer 22 and the system 44 to produce the two beams $S_2$ and $R_2$, and a suitable phase-adjusting means 66 is interposed to cancel the optical path difference introduced by the specimen and thus bring the two beams into phase. As mentioned above, this phase-adjusting means may be a Soleil compensator or the tilting compensator shown in FIGURE 4, a birefringent plate 66 tiltably adjustable about an axis 68 parallel to the polarization plane of one of the beams. The resulting in-phase relationship of the two beams permits visual determination of the polarizer azimuth $\theta_1$ for which the amplitudes are equalized, for a fixed analyzer 76 is positioned with its polarization plane at the desired angle $\theta_2$ of 45° to the planes of component beams $S_2$ and $R_2$. The desired polarizer adjustment will bring the resultant polarization plane of compound beam 40 to an angle $\theta_2$ of 135°, thus producing the darkest field as viewed through an eyepiece 78.

Since the eye is more sensitive to relative brightness than to absolute values of brightness or darkness, a half-shade device such as the biquartz plate 70 is preferably employed in this system to permit the observor to select the darkest match of the two areas of the field. The half-shade device 70 consists of two adjacent equal thicknesses of right- and left-handed quartz 72 and 74 cut perpendicular to the optic axis, and its action is to rotate the plane of polarization by the same small amount but in opposite directions in the two parts of the field. The polarizer may then be set so that the apparent field intensity is the same on either side of the dividing line.

In operating this embodiment of the invention, the stage 34 (shown in system 44, FIGURE 2) is first adjusted to allow both beams to pass through the surround, and the compensator 66 and polarizer 22 are alternately adjusted to produce the darkest match of the two portions of the field. This is easily accomplished since adjusting the compensator lightens or darkens the whole field, and turning the polarizer establishes the match between the two parts of the field. The adjusted "reference" settings $C_1$ and $P_1$ of the compensator and polarizer are noted, and the stage is then adjusted so that the specimen beam passes through the object 36. The compensator 66 and polarizer 22 are again alternately adjusted to produce the darkest match, and the new "specimen" settings $C_2$ and $P_2$ are noted.

The difference between the two compensator settings, $C_2-C_1$, indicates the path difference between the specimen and the surround, which may be determined from the two adjusted angles of the compensator and the optical properties of the birefringent plate 66. If desired, the compensator 66 may be calibrated to indicate directly the phase differences corresponding to different settings for the wavelengths of light employed.

The transmittance ratio may be expressed thus:

$$\frac{T_o}{T_r} = \left(\frac{\tan P_1}{\tan P_2}\right)^2$$

The polarizer settings $P_1$ and $P_2$ govern the size of the angle $\theta_1$ shown in FIGURE 1.

The system shown in FIGURE 4 can also be used without turning the polarizer (or amplitude adjusting means). The procedure is to leave the polarizer at 45° to the axis of the calcite plate in the condenser. Thus the beams will be equal when incident on the specimen and its surround and in general will be unequal after passing through the specimen and surround. The compensator and analyzer are simultaneously adjusted until a dark match is obtained. If the analyzer azimuths are defined just as the polarizer azimuths in FIGURE 1, then the same equation $$\frac{T_o}{T_r} = \left(\frac{\tan \theta_1}{\tan \theta_2}\right)^2$$

gives the ratio of transmittances.

A modification of this embodiment of the invention is shown in FIGURE 5, where analyzer 82 is rotatably adjustable about an axis parallel to the beams 40, and phase compensator 80 is shown as a birefringent plate tiltable about one of its principal axes, $FA_1$, originally oriented parallel to the polarization plane of one of the transmitted component beams $S_2$ or $R_2$ for making transmittance measurements as described above, with the polarization plane PP of analyzer 82 set at 45° to the polarization planes of the beams $S_2$ and $R_2$. In this embodiment, however, plate 80 is so mounted that its tilting axis may be rotatably shifted 45° to position $FA_2$. The plate 80 may then be tilted about the axis $FA_2$ until it produces a one-quarter wavelength retardation between components parallel and perpendicular to its fast axis, for the wavelength of light employed. Compensator 80 and analyzer 82 thus form a Senarmont compensator, and the phase-adjusting plate, acting as a quarter-wave plate, converts the two normally plane-polarized beams $S_2$ and $R_2$ into superimposed counter-rotating circularly polarized beams. Precise determination of the relative phase retardation introduced by the specimen may be made by adjusting analyzer 82 to determine the resultant azimuth of the plane polarized light produced by these counter-rotating component beams. Again the small opposite rotations produced by the biquartz half-shade device 70 permit precise selection of the analyzer azimuth producing the darkest match of the two parts of the field, as described in copending application, Serial No. 765,-248, filed October 3, 1958 which was refiled May 25, 1962, as a continuation-in-part application, Serial No. 201,232; both of these applications being assigned to the assignees of the instant application. Note also that application Serial No. 765,248 has since been allowed to become abandoned.

The embodiments of the invention shown in FIGURES 6 and 7 are designed to improve the accuracy over that possible with visual observation by employing a light sensitive device, such as a photocell or photomultiplier, producing an output signal which may be amplified and displayed on a meter, an oscilloscope or a suitable recording device. Blocks "A" and "B" in FIGURES 6 and 7 represent the circuitry employed for such amplification and display of the photocell output signal.

The analyzer in each of the embodiments of FIGURE 6 and 7 is adapted for continuous rotation about an axis substantially parallel to the direction of the compound beam 40 emerging from the compensator. These analyzers may be rotated by any suitable driving means, such as a hand crank or a small motor. The amount of light passed by such rotating analyzers will fluctuate as they rotate, and these fluctuations may be utilized to permit extremely precise transmittance and interference measurements, as will now be shown.

In the "linear" analyzer embodiment shown in FIGURE 6, rotatably adjustable polarizer 22 and system 44 are followed by a phase compensator 84, which is shown as a Soleil compensator.

In this embodiment, the rotating analyzer assembly 90 is shown mounted within a peripheral ring gear 92, rotated by a power driven shaft 94 via pinion 96. Gear 92 may be held in position by guide means or idler rollers or pinions (not shown). Alternatively, assembly 90 may be belt driven or rotated in any other suitable manner. Low rotating speeds can be used with a photocell or photomultiplier 98, producing an output signal displayed on an ammeter; intermediate speeds may be used for visual observation; and high rotating speeds may be used when the photocell output signal is to be displayed on an A.C. voltmeter or an oscilloscope.

In order to counteract any polarization sensitivity of the photomultiplier 98, a quarter-wave birefringent plate 100 is preferably joined to the second face of the analyzer 102, and a principal axis FA of this quarter-wave plate is oriented at 45° to the polarization plane PP of analyzer 102, thus circularly polarizing the beam 41 transmitted by analyzer 102.

This linear analyzer system may be adjusted to indicate the in-phase relationship of the two component beams $S_2$ and $R_2$ by setting the polarizer 22 and compensator 84 to produce the largest possible fluctuations in the output signal from photomultiplier 98. When the two component beams are in phase, the resultant beam 40 will be plane polarized, and the amount of light passed by assembly 90 will fluctuate from a maximum as it rotates past this plane to a minimum near zero as it passes the normal plane. By determining the azimuth of the analyzer's plane of polarization with respect to the plane of polarizer 22, for which flux received at the photocell 98 is a maximum (or a minimum), the relative amplitudes of the two components $S_2$ and $R_2$ can be compared. When this azimuth angle is 45°, these two in-phase components have equal amplitudes. This azimuth may be determined by the conventional oscilloscope technique of deriving from the rotating analyzer a synchronizing signal to be applied to the sweep axis of the oscilloscope, and applying the photocell output to the signal axis.

Figure 8:
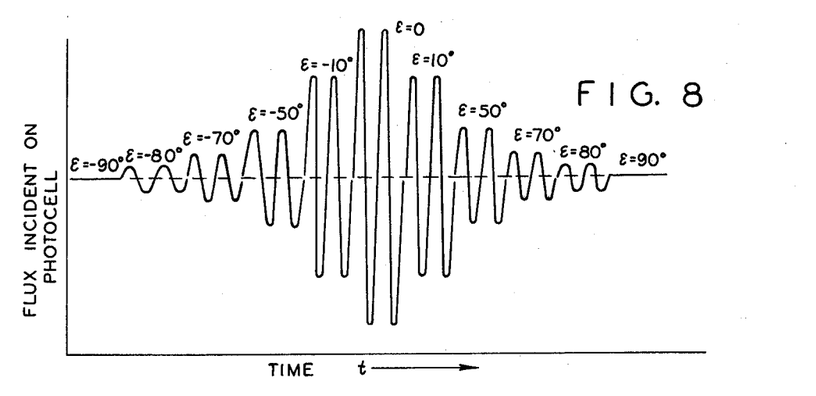
FIGURE 8 is a graphic chart showing qualitatively the photocell output of the embodiment of the invention shown in FIGURE 6.

More accurate observation of the equal amplitude condition of components $S_2$ and $R_2$ can be made in many cases if phase compensator 84 is adjusted to produce one-quarter wavelength phase difference between the two components $S_2$ and $R_2$. When the two amplitudes are equalized, the resultant beam 40 will then be circularly polarized, and the light passed by the rotating analyzer will be of constant amplitude for all axial planes through which the analyzer rotates, as indicated in FIGURE 8. When the amplitudes are not equal, beam 40 will be elliptically polarized, and the resulting photocell output voltage will fluctuate accordingly with rotation of the analyzer.

The light intensity incident on the photocell and the corresponding fluctuating photocell output signal are shown graphically in FIGURE 8. Circularly polarized light (with phase difference, $\epsilon = 90°$) produces the constant signal shown at the right hand side of FIGURE 8. When the light is linearly polarized ($\epsilon = 0$) the largest fluctuations in photocell output are produced, as shown at the center in FIGURE 8. The unfluctuating photocell output signal for circularly polarized light is an accurate indication of equal perpendicular components $S_2$ and $R_2$ with a 90° phase difference between them. For unequal components, or a phase difference not 90°, the resultant beam 40 will be elliptically polarized and a fluctuating output signal will be produced, as shown in FIGURE 8. The resulting precise identification of the desired settings of polarizer 22 and compensator 84 permits the optical path difference and transmittance determinations described above to be made with great accuracy.

The elliptic analyzer embodiment shown in FIGURE 7 incorporates several refinements over the linear form shown in FIGURE 6. In the elliptical arrangement, the rotatably adjustable polarizer 22, and the system 44, again produce the two transmitted beams $S_2$ and $R_2$, superimposed to form compound resultant beam 40. A phase compensator, again shown as a birefringent plate 104 tiltably adjustable about its fast or slow axis 106, permits adjustment of the phase difference between the two components $S_2$ and $R_2$.

The rotating analyzer assembly generally indicated at 108 in FIGURE 7 includes a retardation plate 110 joined to the incident face of analyzer 112, and preferably a quarter-wave plate 114 joined to the emergent face of analyzer 112. For the sake of clarity, the elements 110, 112 and 114 are shown with progressively smaller diameters in FIGURE 7, with a ring gear 116 surrounding only the retardation plate 110. It will be understood, however, that the diameters of these elements are not critical, provided each is large enough to intercept the field of light transmitted by iris opening 118; that all three element (110, 112 and 114) may be mounted within a ring gear if desired; and also that a belt drive or other suitable means may be used to rotate this assembly, as described above with respect to FIGURE 6. It will also be understood that the quarter-wave plates 100 and 114 may be eliminated if compensation for polarization sensitivity of the photocells 98 or 124 is not desired.

Figure 9:
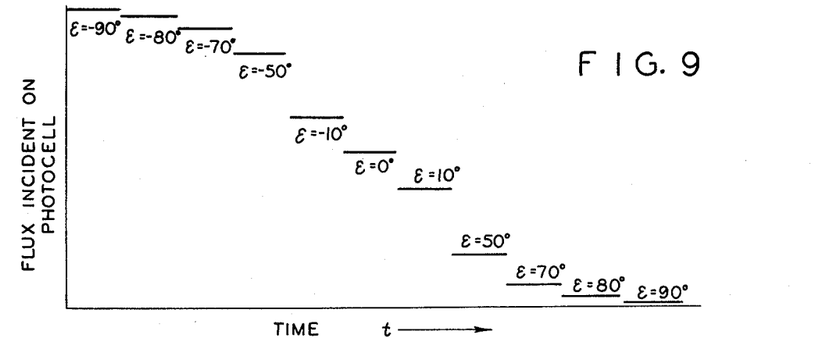
FIGURE 9 is a graphic chart showing qualitatively the photocell output of a particular form of the embodiment shown in FIGURE 7.

The retardation plate 110 may be selected to be a quarter-wave plate for a particular light wavelength employed, and if its principal axis FA is angularly displaced by the angle $\gamma=45°$ from the polarization plane PP of analyzer 112, a special case which might be called a "circular analyzer" is thus achieved. The output signal of photocell 98 will then vary with the ellipticity of the beam 40, and will be a maximum or minimum respectively for right- or left circularly polarized light. This signal will not fluctuate, as can be seen from FIGURE 9. The circular analyzer is therefore well adapted for use with a direct reading D.C. meter indicator. FIGURE 9 also shows, however, that the signal for elliptically polarized light will closely approach the signal for circularly polarized light as the phase difference $\epsilon$ approaches 90°. For this reason the more general case of the elliptic analyzer in which plate 110 is not exactly a quarter-wave plate may be found to have greater general usefulness.

In the "elliptic" analyzer, retardation plate 110 is selected to provide relative phase retardation in the neighborhood of, but not equal to, one-quarter wavelength, between two light beams respectively plane polarized parallel to its fast and slow axes. For example, plate 110 may produce a phase difference ranging between one eighth and three eighths of a wavelength for the particular wavelengths of light employed. Plate 110 is joined to the front face of analyzer 112 with its fast or slow axis FA angularly displaced from the polarization plane PP of analyzer 112 by an angle $\gamma$ in the neighborhood of 45°.

If desired, to compensate for polarization sensitivity of photomultiplier 124, a quarter-wave plate 114 may be joined to the second face of analyzer 112, as shown in FIGURE 7. The assembly of elements 110, 112 and 114 is adapted for continuous rotation by such means as ring gear 116 driven by meshing pinion 120 mounted on driven shaft 122, or the like.

Figure 10:
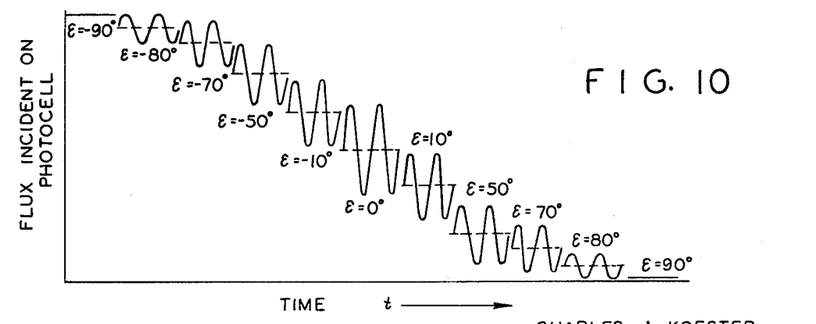
FIGURE 10 is a graphic chart showing qualitatively the photocell output of another particular form of the embodiment shown in FIGURE 7.

The photocell output signal produced by this elliptic analyzer embodiment exhibits the fluctuations shown in FIGURE 10. It will be noted that as the elliptically polarized light approaches left-circularly polarized light having a 90° phase difference, moving progressively from left to right in FIGURE 10, the signal level falls and the amplitude of the fluctuations is reduced. The elliptic analyzer produces a constant signal for circularly polarized light, but right circular ($\epsilon=-90°$) and left circular ($\epsilon=+90°$) polarized light produce constant signals of different values. This allows the observer to select the desired 90° phase difference, and to distinguish the unwanted circularly polarized condition created by compensator adjustments producing adjacent half-wavelength phase differences.

When the output signals produced by the linear analyzer and the elliptical analyzer (FIGURES 8 and 10, respectively) are compared for a nearly-circularly polarized beam 40, e.g. when $\epsilon=80°$, it will be seen that the ratio of fluctuations to average signal $$\left(\frac{I_{max}-I_{min}}{I_{av}} \text{ or } \Delta I/I_{av}\right)$$

is much greater for the elliptical analyzer (FIGURE 10) than for the linear analyzer (FIGURE 8). Since unavoidable noise produced in the detector system, including the optical system, the photocell, and the amplifiers and display devices represented by blocks "A" and "B," will generally increase as the average signal increases, it is evident that the signal to noise ratio of the elliptical analyzer (FIGURE 10) is higher than that of the linear or circular analyzers (FIGURES 8 and 9). Thus, when beam 40 incident on the analyzer is being brought to a condition of circular polarization by adjustments of polarizer 22 and compensator 104, the desired settings for circular polarization can be observed with most precision with the elliptical analyzer embodiment of the invention.

Preferred values for the retardation $\phi$ and orientation angle $\gamma$ of plate 110 can be determined for various detector systems, and the optimum value of the retardation depends on both the type of detector to be used and the extinction factor of the polarizing system. For the rotating analyzer with a retardation plate of retardation $\phi$ oriented with its fast axis FA at an angle $\gamma$ from the analyzer's polarization plane, PP, the flux transmitted by the analyzer may be stated thus:

$$2F = \frac{1}{2} - \frac{1}{2} \sin 2\gamma \cdot \sin \phi + x[\cos^2 \phi \cdot \sin^2 2\gamma + \cos^2 2\gamma]^{\frac{1}{2}} \cdot \cos(2\omega t - \alpha)$$

where $x = P_2 - P_1$, $x$ generally being a small angle so that $\sin x = x$, $\sin 2x = 2x$, $\cos x = 1$, $\cos 2x = 1$. Here $x$ represents the ellipticity in the following sense. Assume that the light incident on the elliptical analyzer has passed first through a polarizer and then through a quarter-wave plate whose fast axis is at an angle of $45° + x$ with respect to the polarizer axis. The quantity $x$ then specifies the resulting state of elliptical polarization, no matter how this state of elliptical polarization was produced. Also, $\alpha = \tan^{-1} \cdot (-\cos \phi \tan 2\gamma)$, and $\omega t$ is the instantaneous angular orientation of the rotating analyzer. This represents completely polarized light, i.e., no stray unpolarized light. We assume that the system is not perfect, so that there is in the beam ahead of the analyzer unpolarized light of magnitude 2A in addition to the polarized component B. Therefore the intensity in the beam passing through the analyzer is given by $$I = A + B\{\frac{1}{2} - \frac{1}{2} \sin 2\gamma \sin \phi + x[\cos^2 \phi \sin^2 2\gamma + \cos^2 2\gamma]^{\frac{1}{2}} \cdot \cos(2\omega t - \alpha)\}$$

In order to simplify the calculations we set $\gamma = 45°$, i.e., the retardation plate at 45° to the analyzer axis. Then $$I = A + B\{\frac{1}{2} - \frac{1}{2} \sin \phi + x \cos \phi \cos(2\omega t - \alpha)\}$$

As $t$ varies, the maximum and minimum values of $I$ are $$I_{max} = A + B\{\frac{1}{2} - \frac{1}{2} \sin \phi + x \cos \phi\}$$

$$I_{min} = A + B\{\frac{1}{2} - \frac{1}{2} \sin \phi - x \cos \phi\}$$

Therefore $\Delta I = I_{max} - I_{min} = 2Bx \cos \phi$.

For a detector whose sensitivity depends only on the magnitude of the fluctuation (e.g. a photoelectric device with negligible noise) we wish to maximize $\Delta I$ with respect to $\phi$. The symbol $\phi_0$ can represent the optimum value of $\phi$, and $$\frac{\delta \Delta I}{\delta \theta} = 0 = -2Bx \sin \theta_0$$

Therefore $\sin \phi_0 = 0$ and $\phi_0 = 0$ or $\nu \pi$ where $\nu =$ any integer.

Thus for this type of detection system a linear analyzer is optimum, no matter what the extinction factor of the system.

Next assume that the sensitivity is limited by the statistical fluctuations in the light beam and the shot noise of the photomultiplier. The magnitude of this noise is given by $$N = K\sqrt{I_{av}}$$

where K is a constant. In order to obtain the maximum signal to noise ratio, we maximize the quantity $$\frac{\Delta I}{N} = \left(\frac{1}{K}\right)\frac{\Delta I}{\sqrt{I_{av}}}$$

For $I_{av}$ we take the value for circularly polarized light:

$$I_{av} = A + B\{\tfrac{1}{2} - \tfrac{1}{2}\sin\phi\}$$

For the optimum value of $\phi$, we obtain $$\sin\phi_o = \frac{2}{B}(A - \sqrt{A(A+B)}) + 1$$

$$= \frac{\sqrt{E}-1}{\sqrt{E}+1}$$

Here $$E = \frac{A+B}{A}$$

is the extinction factor of the system. The extinction factor is a useful quantity because it is easily measured. It is simply the ratio of maximum to minimum flux transmitted by the analyzer as the latter is turned (provided essentially linearly polarized light is incident on the analyzer).

For example, if $E=35$, as in the AO Baker 100-power shearing interference microscope $$\sin\phi_o = \frac{\sqrt{35}-1}{\sqrt{35}+1} = .710$$

$$\phi_o = 45.2°$$

Finally assume that the sensitivity of the detection system is proportional to $$\frac{\Delta I}{I_{av}}$$

Maximizing this quantity with respect to $\phi$ yields $$\sin\phi_o = \frac{B}{2A+B} = \frac{E-1}{E+1}$$

For $$E = 35\ \sin\phi_o = \frac{34}{36} = .945$$

$$\phi_o = 71°$$

Thus we have assumed that $\gamma = 45°$ and found the optimum values of $\phi$. The same calculations could have been performed for other values of $\gamma$, which would have yielded other optimum values for $\phi$.

One way of specifying the optimum preferred combinations would be: The optimum elliptic analyzer is one with a plate of retardation $\phi$ with its axis at an angle $\gamma = 45°$ from the transmission azimuth of the analyzer to which it is attached. If light were to be sent through this combination in the reverse direction, that is first through the analyzer and then through the retardation plate, the polarized light vector would trace out an ellipse with a ratio $b/a$ of minor to major axes. Any other combination of waveplate retardation $\phi$ and orientation, $\gamma$ with respect to the analyzer axis which produces the same shape ellipse will also constitute an optimum elliptic analyzer.

In the above derivations, it has been assumed that monochromatic light is used. If a waveplate is selected for the elliptic analyzer so that its retardation is optimum for one wavelength, it will not in general be optimum for other wavelengths. The rotating linear analyzer does not suffer from this defect.

However, in the elliptical analyzer of FIGURE 7, it is possible to select a retardation plate 110 which will be a quarter-wave plate and thus act as a circular analyzer, for a wavelength $\lambda_0$ near the center of the visible spectrum, while providing the advantages of the elliptical analyzer for other wavelengths above and below $\lambda_0$.

Most of the components of each of the systems here disclosed operate equally well at any wavelength in the visible spectrum. The polarizer 22 of transparent polarizing material is only slightly less effective at the ends of the visible spectrum. The chromatic aberration of such condensers 24 as the Abbe type condenser will introduce only a small amount of stray light. The calcite shearing plates 26 and 38 in the condenser and objective will shear by different amounts depending on the wavelength, but this is immaterial since the condenser and objective calcite plates are as nearly as possible of equal thickness, and therefore the shearing produced by the condenser calcite plate is substantially cancelled out by that in the objective plate. The amplitude of each beam depends only on the azimuth of the polarizer relative to the axis of the calcite, and not on the wavelength. The objective 42 is achromatic and therefore operates well over the visible spectrum. The one component which may be most strongly wavelength dependent is the 90° rotator 32 adjacent the condenser calcite plate 26, particularly if a half-wave retardation plate is employed as rotator 32. The effect of this is to increase stray light and therefore to reduce the sensitivity for other wavelengths. As stated above, this defect can be overcome by the use of the 90° achromatic rotators described in copending application, Serial No. 752,479, filed August 1, 1958, and issued October 30, 1962, as U.S. Patent No. 3,060,808, and the plane of polarization of a plurality of wavelengths can be rotated 90° by means of this device.

The system shown in FIGURE 2 includes the components already described plus the two-position analyzer 46. The latter is as achromatic as the polarizer. In the embodiment of FIGURE 3, it would be necessary to have an achromatic 90° rotator 60. In the embodiments of FIGURES 4, 5 and 6, the adjustable compensator will operate as well for one wavelength as another, provided it is capable of a 360° retardation for the longest wavelength to be used. In FIGURES 4 and 5, the half-shade device may be wavelength-sensitive without seriously affecting the results. For example, with the biquartz plate 70, the half-shade angle will depend on wavelength because of the rotatory dispersion of quartz. This will have an effect on sensitivity but not on the magnitude of the measurements. Thus, the various embodiments of the invention may be used with light of different wavelengths for accurate corroboration of measurements.

The tilting compensator plates 66, 80 and 104 shown in FIGURES 4, 5 and 7 will generally have different transmittance values for the two components beams $S_2$ and $R_2$, since the transmittance for an inclined birefringent plate will not be the same for the components respectively vibrating in planes parallel and normal to the plane of incidence. The ratio of the transmittances, $k$, may be expressed $$k = \frac{S_3}{S_2} \cdot \frac{R_2}{R_3}$$

where $S_3$ and $R_3$ are the amplitudes of the specimen and reference beams, respectively, on leaving the compensator plate.

The ratio $k$ is a function of the angle of incidence, $\beta$, on the compensator plate, and is therefore written $k(\beta)$.

If the angle of incidence required for compensation in the surround is $\beta$ and that for the specimen is $\beta'$, then the expression for the transmittance, T, of the specimen is:

$$T = [k^2(\beta)\tan^2\theta_1][k^2(\beta')\tan^2\theta_2]$$

For a tilting mica compensator plate, it has been found experimentally that the function $k(\beta)$ is the same at $\lambda = 546\ m\mu$ as that for a plane parallel isotropic plate of index 1.60. For compensator plates of other materials, the function $k(\beta)$ can be calculated from theory.

It is desirable to use the smallest tilt of the compensator plate which will produce the desired phase compensation, i.e., either a total phase difference of 0° for the half-shade system or a total phase difference of 90° for the rotating analyzer systems. This will require the correspondingly smallest transmittance correction for the tilted compensator plate in terms of $k(\beta)$ as shown above.

Since the next adjacent 90° phase difference conditions flanking the desired condition ($\epsilon=90°$) will both produce oppositely rotating circular polarization of beam 40, the elliptical and circular polarizers will each distinguish these 0° and 180° ellipticity conditions, as shown in FIGURES 9 and 10, thus eliminating what might be termed "$\pi$ ambiguities." $2\pi$, or 360° ambiguities are easily resolved by taking measurements with two or more different wavelengths of light.

As shown above, the various forms of the present invention permit precise transmittance measurements to be made with shearing type interference microscopes. By employing light of different wavelengths, microspectrophotometry determinations can likewise be made. The present invention permits both optical path difference and transmittance ratio measurements to be made with the same apparatus, and its various embodiments are all economical in design and well adapted for installation as attachments for standard interference microscopes.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:

1. An interference microscope comprising in combination a condenser, specimen stage and objective in optical alignment, said condenser and objective each having optically aligned therewith a birefringent element and with said birefringent elements being disposed at opposite sides of said stage, the first of which is adapted to linearly polarize and separate light incident on said condenser into two coherent orthogonally polarized adjacently spaced beams, both of said beams being adapted to pass through said specimen stage and the other of which birefringent elements is adapted to re-combine said coherent orthogonally polarized adjacent beams for passage through said objective, said objective functioning to focus said re-combined orthogonally polarized beams at an image plane, a rotatable linear polarizer in optical alignment with said condenser and being adapted to vary the relative amplitudes of said two coherent orthogonally polarized beams, and light path difference measuring means in optical alignment with said objective for measuring the relative phase difference between said combined coherent orthogonally polarized beams.

2. An interference microscope optical system comprising in combination a condenser, a specimen stage and an objective arranged in optical alignment, a polarizer operatively positioned to receive light from a light source and to direct same as a beam of linearly polarized light toward said condenser, beam-dividing and re-combining means optically aligned in said system and comprising first and second similar birefringent plates disposed at opposite sides of said stage, respectively, said first birefringent plate being adapted to separate the linearly polarized light incident on said condenser into two adjacent spaced orthogonally polarized coherent beams arranged to pass in close relation to each other through said specimen stage, whereby one of said coherent beams is adapted to pass through a specimen on said stage while the other is adapted to pass through the surround, said second birefringent plate being adapted to receive and re-combine said two adjacent spaced orthogonally polarized coherent beams after passing beyond said stage into superimposed relation for passage through said objective, said beam-dividing and re-combining means also comprising a half-wave retardation plate positioned between said first and second birefringent plates for reversing the respective polarization planes of said two orthogonally polarized coherent beams, said objective functioning to focus said re-combined superimposed coherent beams at an image plane of said objective, said polarizer being rotatable and calibrated so as to vary the relative amplitudes of said two orthogonally polarized coherent beams and measure the amounts of rotatable adjustment thereof, a phase-adjusting compensator disposed in optical alignment with said objective so as to intercept said superimposed focused coherent light beams, said compensator being adjustable so as to alter the phase difference between said superimposed coherent beams, and being calibrated so as to measure the amount of adjustment required of said compensator for balancing said phase difference, and a rotatably adjustable analyzer disposed in the path of said focused beam for enabling visual matching of different areas of the image during adjustment of the adjustable parts of said system.

3. An interference microscope optical system comprising in combination a condenser, a specimen stage and an objective arranged in optical alignment, a polarizer operatively positioned to receive light from a light source and to direct same as a beam of linearly polarized light toward said condenser, beam-dividing and re-combining means optically aligned in said system and comprising first and second similar birefringent plates disposed at opposite sides of said stage, respectively, said first birefringent plate being adapted to separate the linearly polarized light incident on said condenser into two adjacent spaced orthogonally polarized coherent beams arranged to pass in close relation to each other through said specimen stage, whereby one of said coherent beams is adapted to pass through a specimen on said stage while the other is adapted to pass through the surround, said second birefringent plate being adapted to receive and recombine said two adjacent spaced orthogonally polarized coherent beams after passing beyond said stage into superimposed relation for passage through said objective, said beam-dividing and recombining means also comprising a half-wave retardation plate positioned between said first and second birefringent plates for reversing the respective polarization planes of said two orthogonally polarized coherent beams, said objective functioning to focus said re-combined superimposed coherent beams at an image plane of said objective, said polarizer being rotatable and calibrated so as to vary the relative amplitudes of said two orthogonally polarized coherent beams and measure the amounts of rotatable adjustment thereof, a phase-adjusting compensator disposed in optical alignment with said objective so as to intercept said superimposed focused coherent light beams, said compensator being tiltably adjustable so as to alter the phase difference between said superimposed coherent beams, and being calibrated so as to measure the amount of adjustment required of said compensator for balancing said phase difference, and a rotatably adjustable analyzer disposed in the path of said focused beam for enabling visual matching of different areas of the image during adjustment of the adjustable parts of said system.

4. An interference microscope optical system comprising in combination a condenser, a specimen stage and an objective arranged in optical alignment, a polarizer operatively positioned to receive light from a light source and to direct same as a beam of linearly polarized light toward said condenser, beam-dividing and re-combining means optically aligned in said system and comprising first and second similar birefringent plates disposed at opposite sides of said stage, respectively, said first birefringent plate being adapted to separate the linearly polarized light incident on said condenser into two adjacent spaced orthogonally polarized coherent beams arranged to pass in close relation to each other through said specimen stage, whereby one of said coherent beams is adapted to pass through a specimen on said stage while the other is adapted to pass through the surround, said second birefringent plate being adapted to receive and re-combine said two adjacent spaced orthogonally polarized coherent beams after passing beyond said stage into superimposed relation for passage through said objective, said beam-dividing and re-combining means also comprising a half-wave retardation plate positioned between said first and second birefringent plates for reversing the respective polarization planes of said two orthogonally polarized coherent beams, said objective functioning to focus said re-combined superimposed coherent beams at an image plane of said objective, said polarizer being rotatable and calibrated so as to vary the relative amplitudes of said two orthogonally polarized coherent beams and measure the amounts of rotatable adjustment thereof, a phase-adjusting compensator disposed in optical alignment with said objective so as to intercept said superimposed focused coherent light beams, said compensator being adjustable so as to alter the phase difference between said superimposed coherent beams, and being calibrated so as to measure the amount of adjustment required of said compensator for balancing said phase difference, a half-shade device optically positioned to receive the light beam from said compensator, and a rotatably adjustable analyzer disposed in the path of said focused beam beyond said half-shade device for enabling visual matching of different areas of the image during adjustment of the adjustable parts of said system.

5. An interference microscope optical system comprising in combination a condenser, a specimen stage and an objective arranged in optical alignment, a polarizer operatively positioned to receive light from a light source and to direct same as a beam of linearly polarized light toward said condenser, beam-dividing and re-combining means optically aligned in said system and comprising first and second similar birefringent plates disposed at opposite sides of said stage, respectively, said first birefringent plate being adapted to separate the linearly polarized light incident on said condenser into two adjacent spaced orthogonally polarized coherent beams arranged to pass in close relation to each other through said specimen stage, whereby one of said coherent beams is adapted to pass through a specimen on said stage while the other is adapted to pass through the surround, said second birefringent plate being adapted to receive and re-combine said two adjacent spaced orthogonally polarized coherent beams after passing beyond said stage into superimposed relation for passage through said objective, said beam-dividing and re-combining means also comprising a half-wave retardation plate positioned between said first and second birefringent plates for reversing the respective polarization planes of said two orthogonally polarized coherent beams, said objective functioning to focus said re-combined superimposed coherent beams at an image plane of said objective, said polarizer being rotatable and calibrated so as to vary the relative amplitudes of said two orthogonally polarized coherent beams and measure the amounts of rotatable adjustment thereof, a phase-adjusting compensator disposed in optical alignment with said objective so as to intercept said superimposed focused coherent light beams, said compensator being tiltably adjustable so as to alter the phase difference between said superimposed coherent beams, and being calibrated so as to measure the amount of adjustment required of said compensator for balancing said phase difference, a half-shade device optically positioned to receive the light beam from said compensator, and a rotatably adjustable analyzer disposed in the path of said focused beam beyond said half-shade device for enabling visual matching of different areas of the image during adjustment of the adjustable parts of said system.

6. The combination defined in claim 1 including a two-position analyzer adapted to alternately and successively pass one of said re-combined beams while blocking the other, whereby the intensities of said re-combined beams may be compared.

7. The combination defined in claim 1 including a substantially 90° polarization rotator partially interposed in said beams between said objective and said image plane to form a shaded portion in the focused image at said image plane, and an analyzer oriented to block one of said beams over said shaded portion of said field and the other of said beams over the unshaded portion of said field, whereby the simultaneous intensities of said beams may be visually compared.

8. The combination defined in claim 1 in which said light path difference measuring means includes a Soleil compensator interposed in the path of said re-combined beams focused by said objective.

9. The combination defined in claim 1 in which a biquartz plate and an analyzer are interposed in the paths of the re-combined beams and said analyzer has its polarization plane oriented at approximately 45° to the polarization plane of one of the beams.

10. The combination defined in claim 1 in which said light path difference measuring means include calibrated phase-adjusting means interposed in at least one of said focused beams to change the relative phase of said beams, and beam-matching analyzing means interposed in said focused beams for producing a predetermined indication when exposed to circularly-polarized light to determine when the variations in adjustment of said rotatable polarizer and said phase-adjusting means have equalized the amplitudes of said focused beams and produced a one-quarter wavelength phase difference between said beams, whereby the transmittance and optical path of a specimen on said stage and in the path of one of said beams may be measured.

11. The combination defined in claim 10 in which a photocell is positioned to receive the light transmitted by said analyzer and electrical amplifying and display means are coupled therewith for indicating when a variable signal corresponding to variations in transmitted light is produced, and by means of which the desired adjustments of the amplitude-controlling means and the phase-adjusting means may be identified.

12. The combination defined in claim 11 in which a quarter-wave plate is joined to the emergent face of the rotatable analyzer and has its principal axis oriented at approximately 45° to the polarization plane of said analyzer.

13. The combination defined in claim 11 in which a birefringent plate is joined to the incident face of said analyzer and has its principal axis oriented at approximately 45° to the polarization plane of said analyzer.

References Cited in the file of this patent

UNITED STATES PATENTS

| 2,601,175 | Smith | June 17, 1952 |
| 2,732,759 | Osterberg | Jan. 31, 1956 |
| 2,880,648 | Koester | Apr. 7, 1959 |

FOREIGN PATENTS

| 741,557 | Great Britain | Dec. 7, 1955 |
| 796,661 | Great Britain | June 18, 1958 |

OTHER REFERENCES

Jerrard: Optical Compensators for Measurement of Elliptical Polarization, article in Journal of the Optical Society of America, vol. 38, No. 1, January 1948, pp. 35–59.

Jerrard: A Quarter-Wave Compensator with a Sensitive Half-Shadow Device, article in Journal of the Optical Society of America, vol. 44, No. 4, April 1954, pp. 289–296.